United States Patent Office 2,917,737
Patented Dec. 15, 1959

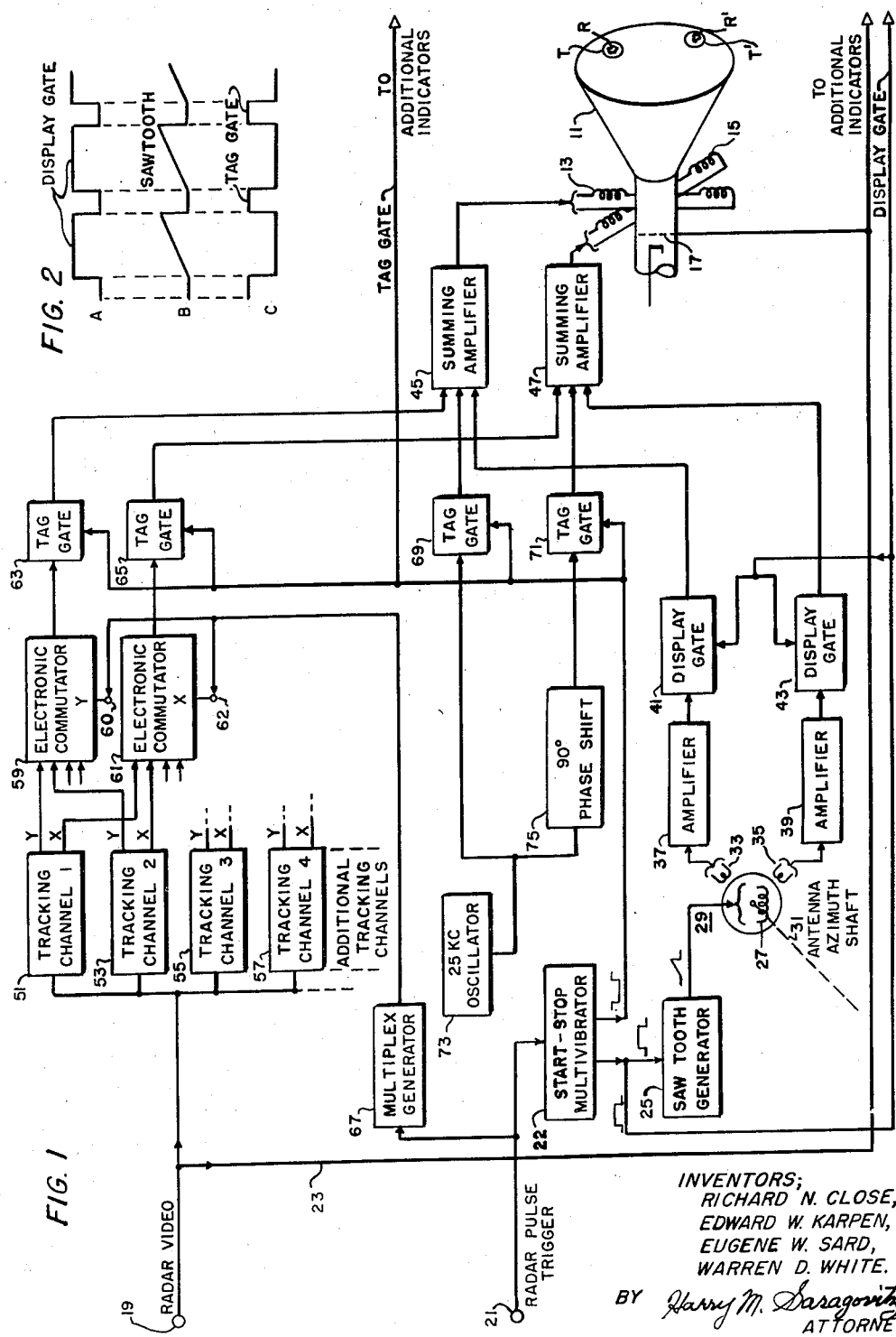

2,917,737

MULTIPLEXED INDICATOR FOR TRACK-WHILE-SCAN CHANNELS

Richard N. Close, Garden City, Edward W. Karpen, Mineola, Eugene W. Sard, Flushing, and Warren D. White, East Norwich, N.Y., assignors to the United States of America as represented by the Secretary of the Army Application February 9, 1956, Serial No. 564,596

8 Claims. (Cl. 343—7.3)

The present invention relates generally to improved indicators for systems utilizing a plurality of track-while-scan channels actuated from a radar ssytem.

It is known that a continuously scanning radar system may be equipped with a plurality of track-while-scan channels which automatically predict the positions of the various targets scanned by the radar beam. In general, a track-while-scan channel is provided for each target that is to be tracked. Each track-while-scan channel is gated in both range and azimuth and responds to reflected radar pulses from its assigned target during each scan of the radar system. The track-while-scan channel utilizes the observed target position on each scan and the history of target positions on previous scans to predict a future target position and to shift its gate voltages accordingly. The track-while-scan channel is actually a computer and may develop its predicted target position in terms of output voltages representative of the coordinates of such target position. These coordinate voltages may be used for any desired purpose, such as to provide the input to computers, fire control apparatus or other equipment.

As previously mentioned, a track-while-scan channel may be provided for each target to be tracked. It is important that the functioning of the track-while-scan channels be subject to checking so that the degree of reliance which can be placed on the output data is known. Consequently, some form of indicator system which will indicate the functioning of all the track-while-scan channels associated with the radar system is desirable.

It is the principal object of the present invention to provide an indicator which will continuously indicate the performance of a plurality of track-while-scan channels.

It is a further object of the invention to provide a single indicator which will compare the predicted target position of each track-while-scan channel with the observed position of the particular target assigned to that channel.

Another object of the invention is to provide an indicator system which allows a single operator to simultaneously monitor the performance of a group of track-while-scan channels.

Other objects and many attendant advantages of the invention will become readily apparent as the same becomes better understood from the following detailed description and the accompanying drawings wherein:

Fig. 1 shows schematically in block diagrammatic form one embodiment of the indicator system in accordance with the invention; and Fig. 2 shows curves used to illustrate the operation of certain component elements in the system of Fig. 1.

The indicator system, according to the present invention, will be described in conjunction with track-while-scan channels which predict their target positions in terms of a pair of voltages which are representative of the rectangular coordinates of target position. It is to be understood, however, that while the indicator system is described in conjunction with rectangular coordinate track-while-scan channels, it is not limited to this type of channel.

Referring to Fig. 1 of the drawing, the indicator device consists of a cathode-ray display tube 11 having a pair of magnetic deflecting coils 13 and 15. The deflecting coils are placed perpendicular to the beam axis of the cathode-ray tube and are oriented at 90° with respect to one another in the usual manner. The cathode-ray tube 11 has a long persistence screen and is equipped with a cathode and a grid 17 which serves to intensity modulate the beam of the tube. Other conventional cathode-ray elements and circuitry, such as focusing structure and accelerating anodes, for example, have been omitted to simplify the drawing.

The cathode-ray tube serves first as a conventional plan-position-indicator device for the continuously scanning radar system (not shown). The radar video information derived from targets located within the area covered by the radar system is applied to a terminal 19 in the indicator system of Fig. 1. The radar pulse trigger voltages from the radar system are applied to a terminal 21. The terminal 19 is connected by a lead 23 to the grid 17 of the cathode-ray tube 11 in a conventional manner.

The radar pulse trigger voltages received at terminal 21 are supplied in parallel to the input of the multiplex generator 67 and the input of a multivibrator 22 of the start-stop type. The operation of the multiplex generator 67 in response to the applied voltages will be discussed later. A start-stop multivibrator, as is well known, is a biased rectangular wave generator which operates for one cycle when a synchronizing trigger signal is applied to its input. One type of start-stop multivibrator which could be used for multivibrator 22 in the system of Fig. 1 is that disclosed in United States Patent No. 2,432,516 issued to S. Doba, Jr., on December 16, 1947, which consists of two cathode-coupled triode amplifier sections. This multivibrator as described in detail in the specification of that patent, is adapted to oscillate in response to each positive-sense, synchronizing pulse applied to the grid of one amplifier section to produce a positive-sense square or rectangular wave pulse in the plate circuit of one triode section and a negative-sense square or rectangular pulse in the plate circuit of the other triode section, which pulses by proper selection of the circuit constants of the multivibrator may be made of any desired length. As indicated, the positive pulses produced in the output of the multivibrator 22 are applied as synchronized triggering or gating pulses over appropriate leads to control the operation of a sawtooth wave generator 25 and of the "display gate" devices 41 and 43, and the negative pulses are applied as synchronized gating pulses over other leads to control the operation of the "tag gate" devices 63, 65, 69 and 71 for purposes to be discussed hereinafter.

Alternatively, a special type of vacuum tube circuit known as a "bootstrap drive," or a very stable triggered gate-producing circuit using a pentagrid tube, known as a "Phanastron," may be used for producing the gating and triggering pulses in place of the start-stop multivibrator 22.

The voltage of sawtooth waveform produced by the generator 25, which may be of any of the known types, in response to each positive triggering pulse received from multivibrator 22 is applied to the primary winding 27 of a resolver transformer 29. As indicated diagrammatically, primary winding 27 is mounted upon a shaft 31 in such a manner as to be relatively rotatable with respect to a pair of secondary windings 33 and 35. The shaft 31 is driven in synchronism with the rotation of the search radar antenna in its continuous scan by a means not shown. The secondary windings 33 and 35 are relatively spaced about the stator structure of the resolver transformer so that they are located at an angle of 90° with respect to one another.

The voltages induced in the secondary windings 33 and 35 of transformer 29 are respectively applied as inputs to a different one of a pair of amplifiers 37 and 39. The output circuit of the amplifier 37 is connected through a display gate circuit 41 to a first input circuit of a summing amplifier 45. Similarly, the output circuit of the amplifier 39 is connected through a display gate circuit 43 to a first input circuit of a summing amplifier 47. The outputs of the summing amplifiers 45 and 47 are connected to the magnetic deflection coils 13 and 15, respectively, of the cathode-ray tube 11.

The display gate circuits 41 and 43 may be of any type known in prior art and need not be specifically described herein. Each is arranged to "open" under control of the positive gating pulses applied thereto from the output of multivibrator 22, in synchronism with the sweep sawtooth voltage applied to its input from the output of amplifier 37 or 39, respectively, so as to allow passage of that voltage only when it is increasing, as indicated by the curves (A) and (B) of Fig. 2, showing the phase relations of the positive gating voltages and the sawtooth voltages applied to each display gate device. The summing amplifiers 45 and 47 are also well known conventional circuits. As illustrated, each summing amplifier includes three input circuits and one output circuit. The output voltage of each summing amplifier is proportional to the instantaneous sum of the input voltages.

The portion of the indicator system described above constitutes the structure of a plan-position-indicator display system. The sawtooth generator 25 synchronized by the radar pulse trigger voltage and the resolver transformer 29 driven thereby in synchronism with the scanning rotation of the radar antenna, through the apparatus associated with the output of that transformer, will set up a rotary sweep for the electron beam produced in the display tube 11 in a well known manner. The electron beam of the cathode-ray tube 11 is intensity modulated by the reflected video information applied to the grid 17 over the lead 23 with the result that a plan-position-indicator representation of all the targets in the search field of the radar system is obtained on the screen of the tube 11. The action of the display gates 41 and 43 is such that this observed target position representation is "written" only during the outward sweep of the electron beam from the center of the cathode-ray tube screen. The long persistence screen preserves the target position representations from one sweep of the antenna to the next.

The electron beam of the cathode-ray tube of a plan-position-indicator system such as described above, normally returns directly to the center of the tube screen during the interval between range sweeps. Blanking circuits are usually provided to reduce the intensity of the beam during its retrace sweep so that no fluorescence of the screen occurs. In the present indicator, however, the retrace time is utilized to record the predicted target positions of the track-while-scan channels on the cathode-ray tube screen. This result is secured in general by shifting the beam position to a portion of the screen representative of the predicted position which is set up in each track-while-scan channel. A predicted target position is recorded on each return sweep with the result that the predicted positions of all track-while-scan channels are recorded continuously. The apparatus for accomplishing these results will now be described in connection with Fig. 1.

A plurality of track-while-scan channels are fed from a single search radar system. Four such channels 51, 53, 55 and 57 are shown but it is to be understood that any number of such channels may be utilized. Each track-while-scan channel may, for example, be of the type disclosed in United States Patent No. 2,624,877 issued to Britton Chance on January 6, 1953, or in the copending application of Richard N. Close, Serial No. 507,749, filed May 9, 1955, for Automatic Track-While-Scan Channel. The specific structure of the track-while-scan channels forms no part of the present invention, and it is sufficient to indicate that each channel is a computer system which produces an output representative of the predicted position of its assigned target. The predicted position is derived from past error history of the particular target and is expressed in terms of a pair of voltages which are representative of the rectangular coordinates of the target position. The inputs of the track-while-scan channels including 51, 53, 55 and 57 are connected to the radar video terminal 19 so as to be controlled by the "Video" information received at that terminal from the associated radio system. Each track-while-scan channel produces two output voltages as indicated by the output leads designated X and Y in the drawing. The voltage on the X output lead of channel 51 is proportional to one coordinate of the predicted position of the target assigned to and tracked by that channel. The voltage on the Y output lead is proportional to the other rectangular coordinate of the predicted target position.

The Y output lead of track-while-scan channel 51 is connected through an electronic commutator 59 and a tag gate circuit 63 to a second input circuit of the summing amplifier 45. The X output lead of track-while-scan channel 51 is connected through an electronic commutator 61 and a tag gate circuit 65 to a second input circuit of the summing amplifier 47. The Y and X output leads of all the other track-while-scan channels are similarly connected through the electronic commutators 59 and 61 and the tag gates 63 and 65, respectively, to the input circuits of summing amplifiers 45 and 47.

The electronic commutators 59 and 61 function as electronic switches and may take the form of well known ring circuits. The mulitple input circuits for each commutator 59 and 61, in accordance with the known operation of ring circuits, are sequentially connected to the output circuit thereof in response to control or trigger pulses applied to control terminals 60 and 62, respectively, of the commutator circuit.

The electronic commutator or ring circuits 59, 61 are triggered or stepped by voltages applied to their respective control terminals from a multiplex generator or frequency multiplier 67. The multiplex generator 67 in turn is triggered by the radar pulse trigger voltages from the terminal 21. The tracking information from the various tracking channels may be used for other purposes than that of the present indicator system. The electronic commutators, therefore, do not necessarily step once per radar sweep but may step at a multiple of the radar trigger rate so that every fourth or fifth channel is presented during successive retrace time intervals. The total number of channels and the multiplex generator trigger rate are chosen to ensure that a different channel is connected to the indicator during each successive retrace period and all of the tracked target data is displayed before the radar plan-position-indicator presentation repeats. Other electronic commutators operating at the same rate, but out of step with those shown, may be used to connect the tracking channels to any other utilization devices as desired.

The multiplex generator or frequency multiplier 67 may be of any conventional type, such as a free running oscillator, adapted to be synchronously operated by the applied radar pulse trigger voltages. This generator should be adapted to operate at the repetition frequency of the applied radar input pulses or at multiples of that frequency. Such circuits are well known in the prior art.

A pair of similar tag gate circuits 69 and 71 have their inputs fed in parallel from the output of the 25 kilocycle oscillator 73 directly and through the 90° phase shifting device 75, respectively, and their outputs respectively connected to a third input circuit of the summing amplifier 45 and a third input circuit of the summing amplifier 47. The operations of the tag gate circuits 69 and 71 and those of the previously-mentioned tag gate circuits 63 and 65 are controlled by the negative rectangular gating pulses supplied from the output of the multivibrator 22 as indicated. As indicated at (C) and (B) in Fig. 2, the negative gating voltage pulses applied to each of the tag gates 63, 65, 69 and 71 are synchronized with the sawtooth voltage wave applied through the summing amplifiers 45 and 47 to the cathode-ray tube 11, so that these gate circuits "open" when the sawtooth control voltage decreases during the retrace interval. The tag gate circuits, therefore, pass their respective inputs to the summing amplifiers 45 or 47 during this interval.

From the above description it will be apparent that during each retrace period the Y and X output voltages of only one of the tracking channels will be connected to the summing amplifiers 45 and 47, respectively. These voltages after amplification in these amplifiers will be supplied to the deflection coils 13 and 15 causing them to act on the electron beam of the cathode-ray tube 11 so that it impinges on the screen at a position representative of the predicted target position output of that particular channel. During the next retrace interval the beam is similarly deflected to present the position data from another channel and so on until the predicted target data from all the track-while-scan channels are displayed.

Obviously, if the track-while-scan channels are operating properly each predicted target position will be the same as the observed position of the target. The luminescence of the screen produced during the retrace time therefore would be in the same location as the luminescent indication produced by the plan-position-indicator operation of the cathode-ray tube and would be indistinguishable therefrom. Means are therefore provided to separate the predicted target position representations from the observed target position representations and to allow the system operator to compare the two sets of indications.

The separation of the two sets of indications is obtained by the application of a pair of dephased alternating voltages to the third input circuits of the summing amplifiers 45 and 47 during the retrace period, which when amplified by these amplifiers will control the deflecting coils 13 and 15 of the cathode ray tube 11 so as to cause the electron beam to sweep in a circular pattern centered about the predicted target position established by the track-while-scan voltages. The dephased alternating voltages are derived from a source, such as an oscillator 73, which may operate to continuously produce an output wave of any convenient frequency, for example, in the neighborhood of twenty-five kilocycles per second. As previously stated, a portion of the output of the oscillator 73 is fed directly through the tag gate circuit 69 to the third input circuit of the summing amplifier 45. Another portion of the output of the oscillator 73 is fed through a 90° phase shifting network 75 and the tag gate circuit 71 to the third input circuit of the summing amplifier 47. The dephased alternating voltages which are fed to the summing amplifiers 45 and 47 and are applied through these amplifiers to the deflecting coils 13 and 15, respectively, of the tube 11, operate only during the retrace period to superpose a rotating field effect on the deflection position established by the voltages from the track-while-scan channels. This results in the electron beam being swept in a circular pattern to establish the tag circle representations shown at T and T' on the face of the cathode-ray tube screen.

The configuration of the tag circle representations enables the operator to immediately determine whether the tracking operation of the various channels is correct. Each observed target representation, such as R and R', is enclosed by its predicted target position representation T or T'. Any departure of the tag circles from a centered relationship about the corresponding observed target locations is readily apparent.

The indicator system as described above is one in which an operator has available on a single cathode-ray tube screen a continuous record of the observed position of all targets within an area covered by a scanning radar. The same screen also gives a positive indication of the operation of a number of track-while-scan channels assigned to specific targets. The indicator system thus functions to display information as to the performance of a plurality of track-while-scan channels without interfering with the normal functioning of the plan-position-indicator of the radar system. No separate indicator tubes are required to check the performance of the track-while-scan channels but all information is displayed upon the single screen of one indicator tube.

In practice an operator is usually assigned to a specific number of targets. If more targets are to be tracked than a single operator can conveniently control additional indicators substantially identical to that shown in the drawing may be provided. This is indicated by the leads designated by the legend "to additional indicators." Only those track-while-scan channels assigned to a specific indicator need be connected thereto.

While there has been described what is at present regarded as the preferred embodiment of the invention, it will be obvious to those skilled in the art that various changes and modifications may be made therein without departing from the invention, and it is therefore the aim of the appended claims to cover all such changes and modifications as fall within the true spirit and scope of the invention.

What is claimed is:

1. A multiplexed indicating system for use with a continuously scanning radar system including a source of synchronizing pulses having a given pulse repetition rate and a source of received radar video signals carrying information on the present positions of a plurality of targets within the scanning range of the radar system, said indicating system including an indicator tube having cathode-ray beam producing means and a pair of beam deflecting members, a range sweep generator adapted to be triggered in response to each of the pulses from the first source, to generate a sawtooth sweep voltage, a plurality of track-while-scan channels fed from said source of radar video signals for respectively deriving therefrom information on the predicted position of different individual targets, switching means operating in synchronous relationship with the pulses from said first source to connect the outputs of said channels in sequence to said beam deflecting members, an individual first gating device connected in circuit between each of said beam deflecting members and the output of said sweep generator, an individual second gating device connected in circuit with each of said beam deflecting members so as to be effective to control transmission in the connections thereto from the output of one of said track-while-scan channels provided by each operation of said switching means, a second generator controlled from said first source and operating in response to each of the pulses therefrom to generate simultaneously two like control pulses of opposite polarity and means to apply a portion of each generated control pulse of one polarity to each of the first gating devices and a portion of each generated control pulse of the opposite polarity to each of the second gating devices, each of the first gating devices being adapted to open in response to an applied control pulse to allow transmission therethrough of the sawtooth sweep voltage applied thereto from the first generator, to the associated beam deflecting member only during the sweep interval in which that voltage is increasing, each of the second gating devices being adapted to open in response to an applied control pulse to allow transmission therethrough, to the associated beam deflection member of the predicted position information from said track-while-scan channels during a retrace interval when the sawtooth sweep voltage applied to that member is decreasing.

2. The indicating system of claim 1, in which said range sweep generator is triggered in response to the application to its input of one portion of each control pulse of said one polarity generated by said second generator under control of the pulses from said first source.

3. The indicating system of claim 1, in which said switching means is operated at the repetition frequency rate of the synchronizing pulses from said first source, or at an integral multiple of that rate.

4. A multiplexed indicator for use with a continuously scanning radar system including a source of synchronizing pulses having a given pulse repetition rate and a source of received radar video signals carrying information on the present position of targets within the scanning range of the system, said indicator including an indicating tube having a control grid supplied with radar video signals from the second source, a cathode-ray beam producing means, a pair of beam deflecting members and a long persistence screen, a generator controlled from the first source and adapted to be triggered in response to each pulse therefrom to produce a sweep voltage of sawtooth form for controlling said beam deflecting members, a plurality of track-while-scan channels fed from said source of radar video signals for respectively deriving therefrom information on the predicted position of a different individual target, switching means operating in synchronous relationship with the pulses from said first source to connect the outputs of said channels in sequence to said beam deflecting members, an individual first gating device connected in circuit between each of said beam deflecting members and the output of said generator, an individual second gating device connected in circuit with each of said beam deflecting members so as to be effective to control transmission in the connections thereto from the output of one of said track-while-scan channels provided by each operation of said switching means, means responsive to each of the pulses from said first source to generate simultaneously two like rectangular gating pulses of predetermined length and of opposite polarity, means for applying a portion of each generated gating pulse of one polarity to each of the individual first gating devices and a portion of each generated gating pulse of opposite polarity to each of the individual second gating devices, each of the first gating devices being adapted to open in response to an applied gating pulse to allow transmission therethrough of the sawtooth sweep voltage applied to its input, to the associated beam deflecting members only during the sweep interval in which that voltage is increasing, each of the second gating devices being adapted to open in response to an applied gating pulse to allow transmission therethrough of the predicted position information received from the particular track-while-scan channel connected thereto at the time, to the associated beam deflecting member during the retrace interval in which the sawtooth voltage applied to that member is decreasing, the resulting movement of the cathode-ray beam over the screen of the indicator tube under control of the beam deflecting members causing indications to appear on said screen at positions respectively representing the predicted position of a different one of said individual targets.

5. A multiplexed indicating system for use with a continuously scanning radar system including a source of synchronizing pulses having a given pulse repetition rate and a source of radar video signals carrying information received on the present position of targets within the scanning range of the radar system during a scanning interval, said system including an indicating tube having cathode-ray beam producing means and a pair of beam deflecting members, a range sweep generator which when triggered by an applied pulse of a given polarity is adapted to generate a sawtooth voltage which increases over a sweep interval and decreases over the subsequent retrace interval, a plurality of track-while-scan channels fed from said source of radar video signals for respectively predicting the future position of a different individual target from the present position information on that target derived from the radar video signals from that source, switching means actuated at the repetition rate of the pulses from said first source, or an integral multiple of that rate, to connect the outputs of said channels in sequence to said beam deflecting members, an individual first gating device connected between each of said beam deflecting members and the output of said sweep generator, an individual second gating device connected in circuit with each of said beam deflecting members so as to be effective to control transmission in the connections thereto from one of said track-while-scan channels provided by each operation of said switching means, a start-stop multivibrator controlled by said first source and responsive to each alternate pulse therefrom to generate two like rectangular control pulses of controllable length but of opposite polarity and means to apply a portion of each generated control pulse of one polarity to said range sweep generator to trigger that generator, and to each of the first gating devices as a gating pulse therefor, and to apply a portion of each generated pulse of opposite polarity as a gating pulse to each of the second gating devices, each of the first gating devices being adapted to open in response to each applied gating pulse to allow transmission therethrough of the sawtooth voltage applied to its input from said range sweep generator, to the associated beam deflecting member only during the sweep interval in which that voltage is increasing, each of the second gating devices being adapted to open in response to each applied gating pulse to allow transmission therethrough of the predicted position information applied thereto from the particular one of said track-while-scan channels connected thereto at the time, to the associated beam deflection member during the retrace interval when that sawtooth voltage is decreasing.

6. A multiplexed indicating system for use with a continuously scanning radar system including a source of synchronizing pulses having a given pulse repetition rate and a source of received radar video signals giving information on the present position of targets in the scanning range of the radar system, said indicating system including an indicator tube having cathode-ray beam producing means and beam deflection elements, a generator adapted to be triggered in response to each of said pulses from the first source to produce a sawtooth sweep voltage for controlling said beam deflecting elements of said tube, a plurality of track-while-scan channels fed from said source of radar video signals for respectively deriving therefrom information on the predicted future position of individual targets, means including a multiplex generator operated in synchronous relationship with the pulses from the first source and commutating means, controlled thereby, for connecting the outputs of said channels in sequence to said beam deflection elements and individual normally closed gating means respectively connected in circuit between each of said beam deflection elements and the output of the first generator and between each of said beam deflection elements and the commutating means for said track-while-scan channels, said gating means being respectively adapted to open in response to each of the pulses from said first source so as to allow transmission of the sawtooth sweep voltage output of said first generator to said beam deflection elements only during a sweep interval in which said voltage is increasing and transmission of the predicted target position information from the output of the particular one of said track-while-scan channels connected to said elements by said commutating means only during a retrace interval when the sawtooth voltage applied to these elements is decreasing, respectively.

7. A multiplexed indicating system for use with a continuously scanning radar system including a source of synchronizing pulses having a given pulse repetition rate and a source of received radar video signals giving information on the present position of targets in the scanning range of said radar system, said indicating system including an indicating tube having a grid supplied with said radar video signals from the second source, cathode-ray beam producing means, a pair of beam deflecting members and a long persistence screen, a range sweep generator connected to the first source and adapted to be triggered in response to each of the pulses therefrom to produce a sawtooth sweep voltage for application to said deflection members, which increases over a sweep interval and decreases over a retrace interval, a plurality of track-while-scan channels fed from said source of radar video signals, for respectively deriving therefrom information predicting future positions of individual targets, switching means activated at the repetition rate of the synchronizing signals from said first source to connect the outputs of said channels in sequence to said beam deflecting members, another alternating current source having two separate output circuits and adapted to produce in these output circuits respectively one of two relatively dephased output voltages, an individual first gating device connected between each of said beam deflecting members and the output of said range sweep generator, an individual second gating device connected between each of said beam deflection members and the outputs of all said track-while-scan channels through said switching means, an individual third gating device connected between each of said beam deflecting members and each of said separate output circuits of said other alternating current source, means controlled by each of said pulses from said first source for conditioning each of said first gating devices to transmit the sawtooth sweep voltage applied thereto from the output of said range sweep generator to the associated beam deflection member only during the sweep interval of that voltage, and for conditioning each of said second and said third gating devices to transmit the predicted target position information and the dephased alternating voltages, respectively, applied to their respective inputs, to the associated beam deflection member during the retrace interval of that voltage, the resultant movement of the cathode-ray beam over the screen of the indicator tube under control of the beam deflecting members causing first dot indications to appear on said screen at positions respectively representing the predicted position of a different individual target as determined by the voltage output of a different one of said track-while-scan channels, and other circular indications respectively surrounding each of said dot indications to appear thereon, the departure of each circular indication from a centered relationship about the corresponding dot indication indicating to an observer the error in the tracking operation of a particular track-while-scan channel.

8. The indicating system of claim 7, including a third generator which is responsive to each of said pulses from said first source to generate two like rectangular pulses of suitable length, which are of opposite polarities, and in which each of said individual second gating devices is conditioned to transmit the sawtooth voltage applied thereto from said range sweep generator to the associated beam deflecting member during the sweep interval of that voltage, by a pulse of one polarity produced by said third generator in response to each pulse controlling the triggering of that generator, and each of said individual second and third gating devices is conditioned to transmit the predicted target information or one of said dephased voltages, respectively, applied to its input, to the associated beam deflecting member during the retrace interval of the sawtooth voltage applied to that member at that time, in response to the pulse of opposite polarity produced by said third generator.

References Cited in the file of this patent

UNITED STATES PATENTS

| 2,688,743 | Berger | Sept. 7, 1954 |
| 2,709,804 | Chance | May 31, 1955 |